No. 797,247. PATENTED AUG. 15, 1905.
A. R. WILSON & L. M. DULL.
APPARATUS FOR MANUFACTURING GLASSWARE.
APPLICATION FILED FEB. 10, 1903.

Amos R. Wilson,
Lester M. Dull, Inventors.

Witnesses
Attorney

UNITED STATES PATENT OFFICE.

AMOS ROBERROW WILSON AND LESTER MARTIN DULL, OF TOLEDO, OHIO, ASSIGNORS OF ONE-HALF TO A. R. GORDON, FLOYD N. DULL, AND W. E. DITTENHAVER, OF TOLEDO, OHIO.

APPARATUS FOR MANUFACTURING GLASSWARE.

No. 797,247. Specification of Letters Patent. Patented Aug. 15, 1905.

Application filed February 10, 1903. Serial No. 142,734.

*To all whom it may concern:*

Be it known that we, AMOS ROBERROW WILSON and LESTER MARTIN DULL, citizens of the United States, residing at Toledo, in the county of Lucas and State of Ohio, have invented a new and useful Apparatus for Manufacturing Glassware, of which the following is a specification.

The present invention relates particularly to machines of that character wherein the articles are pressed, though there are certain features that are capable of use with other types of machines, as will be apparent to those skilled in the art.

The object is to provide a machine which will manufacture glass articles with great rapidity and is automatic in its operation to such an extent that the services of skilled workmen are not required.

One of the features of this invention relates to a machine including in its make-up molds, cores, means for feeding glass to the molds, and mechanism for introducing the cores into the molds prior to the feeding of glass thereto. This arrangement is of great importance, as it insures not only the proper positioning of the cores, but also the complete filling of the molds without previously measuring the batch to be placed therein, as has been necessary heretofore so far as we are aware.

Another feature resides in the mechanism for operating the cores, said mechanism being simple and positively operated by the means which drives the machine.

A still further feature relates to simple means for receiving the articles from the molds and delivering them from the machine.

An embodiment of the invention is illustrated in the accompanying drawings, though it is to be understood that the invention is not limited to the specific details of construction shown and described, but is open to various changes and modifications within the scope of the claims hereto appended.

In the drawings.

Similar reference-numerals indicate corresponding parts in all the figures of the drawings.

Figure 1:
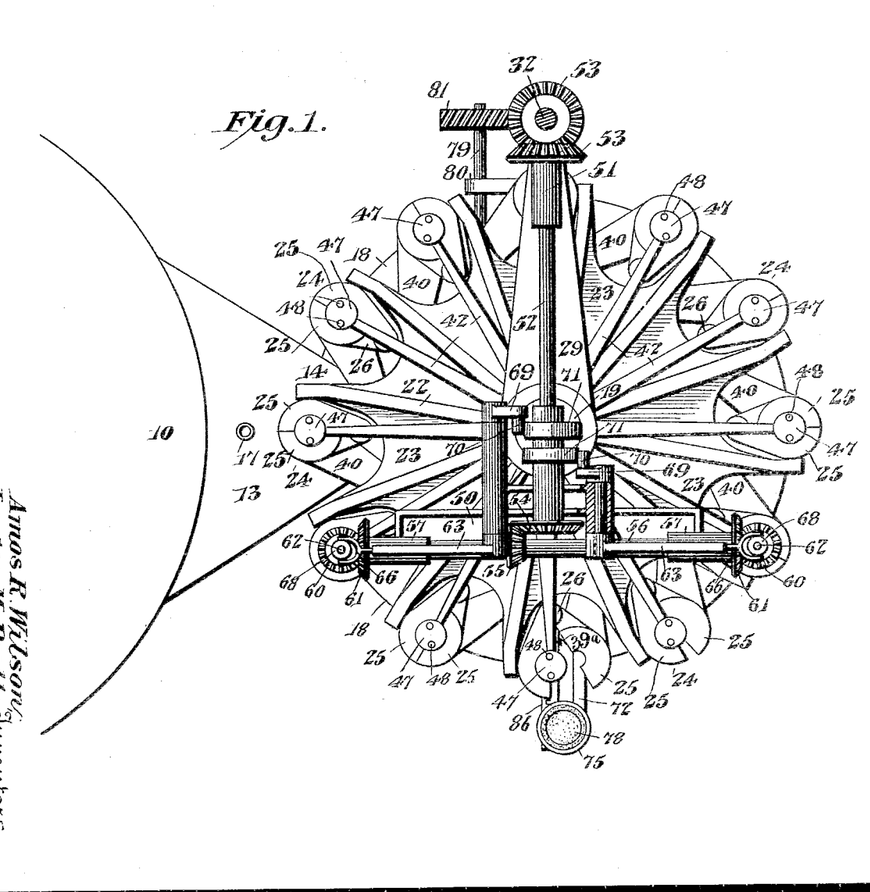
Figure 1 is a top plan view of the machine.
Figures 4, 6:
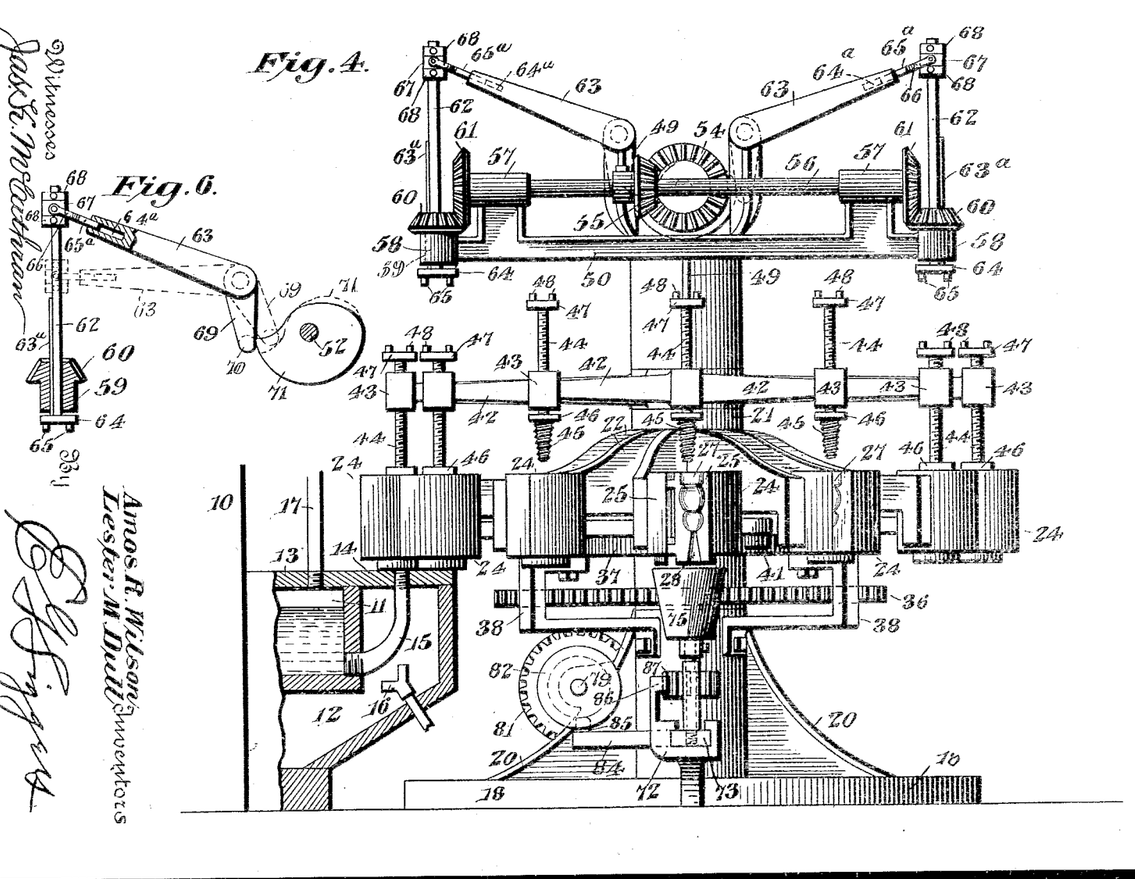
Fig. 4 is an elevation of a different side of the machine from that illustrated in Fig. 3.
Fig. 6 is a detail section illustrating the mechanism for operating the cores.

In the embodiment herewith illustrated suitable glass-feeding mechanism is employed, which is illustrated in Figs. 1 and 4. This mechanism *per se* is fully described and claimed in a copending application Serial No. 142,733, to which attention is invited for a complete understanding of the structure. As is shown, however, a melting-tank 10 is employed, from which projects a reservoir 11, the projecting end thereof being surrounded by a heating-chamber 12. The top 13 of this reservoir extends beyond the same and constitutes the top of the heating-chamber. It also forms a platform 14 through and to the upper face of which extends a glass-conduit 15, that leads from the lower front end of the reservoir 11. The chamber 12 and the conduit are heated by a suitable burner 16. An air-pipe 17 is connected with the reservoir and is arranged to conduct air under pressure to the same. Thus it will be seen that when air is admitted to the reservoir the glass will be forced through the conduit 15 to the platform 14. The machine hereinafter described coacts with this glass-feeding mechanism and is constructed substantially as follows:

A base 18 of suitable dimensions is provided and from the same projects a standard 19, made rigid at its lower end by suitable braces 20, extending to the base. Upon this standard is journaled a carrier, comprising a hub 21, carrying radial arms 22, connected by webs 23. On the outer ends of the arms 22 are secured molds 24, comprising sections 25, hinged together, as shown at 26. The molds are provided with cavities 27, that are of the shape of the articles to be manufactured, a portion of these cavities being located in each section. In the present instance the machine is intended for making insulators; but it will be readily seen that articles of various kinds can be manufactured by changing the shapes of the cavities. The molds are movable over the platform 14 and they are provided in their bottoms with inlet-channels 28, arranged to aline with the discharge end of the glass-conduit 15.

Figure 5:
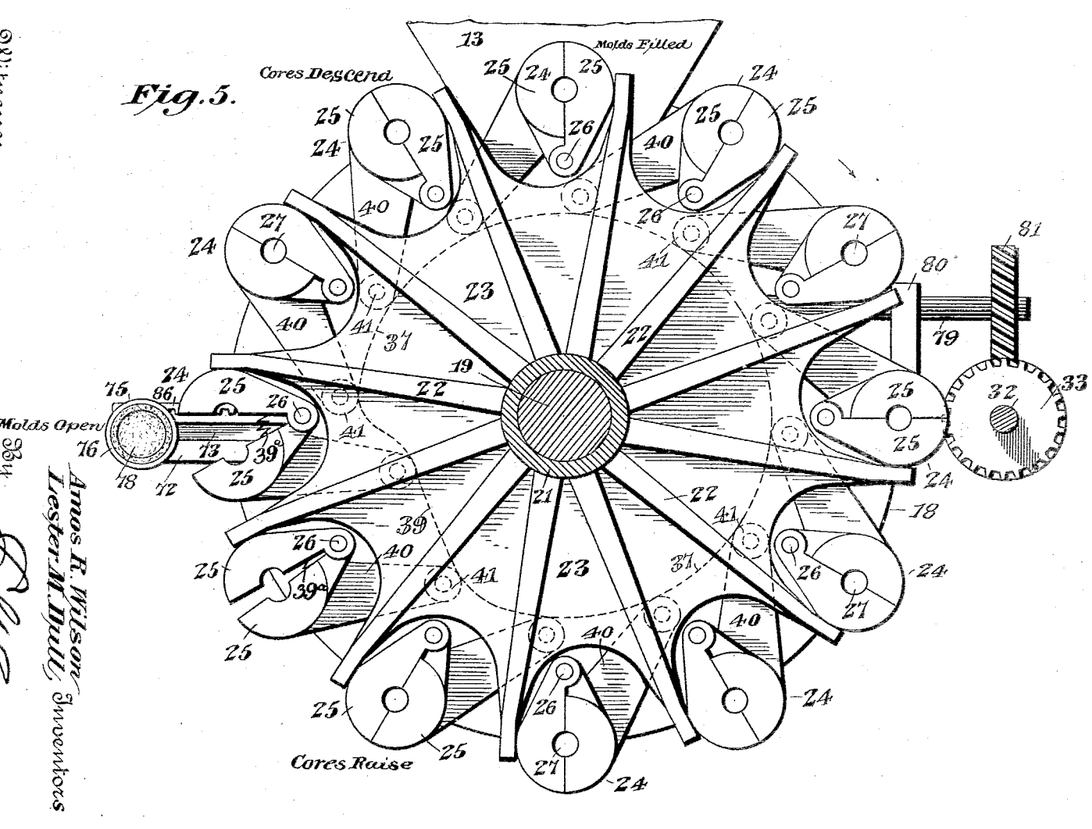
Fig. 5 is a horizontal sectional view.

The upper end of the standard 19 carries a casting that is located above the carrier, and one part of this casting is in the form of a bracket 29, that overhangs the base and is provided with a vertical journal-bearing 30. One of the lower braces 20 is extended, and at the end thereof is located an upright journal-box 31 alined with the bearing 30. In these bearings is rotatably mounted a driving-shaft 32, operated by any suitable power and carrying on its lower portion a gear-wheel 33, meshing with an idler 34, that is attached to another idler 35. This idler 35 is in gear with a large wheel 36, secured to the hub of the carrier. As a result it will be seen that the carrier is slowly and continuously rotated from the driving-shaft. The molds are automatically opened and closed, and to this end a cam 37 is arranged between the gear-wheel 36 and the radial arms 22, being held against rotation by any suitable means, in the present instance said means being illustrated in the form of stirrups 38, secured to the cam and to the lower end of the standard. The cam 37 is provided at the desired place with an inset portion 39, which is preferably located a short distance from the glass-feeding mechanism, as indicated in Fig. 5. One section of each mold is rigidly secured in any suitable manner to one of the arms 22, the other section being capable of swinging toward and from the fixed section. This movable section carries a rearwardly-projecting and trailing finger 40, having at its free end a roller 41, which bears against the periphery of the cam. During the greater part of the movements of the molds the sections are held in closed positions by the coaction of the fingers and the cam; but when the fingers reach the inset portion 39 the sections can be swung apart by any well-known means—as, for instance, a spring $39^a$, interposed therebetween—as fully illustrated in Fig. 5.

Extending over the molds and constituting a part of the carrier are radial arms 42, the outer ends of which have eyes 43, in which are screwed the shanks 44 of cores 45, that are provided with tapering screw-faces, as shown. The pitch of the threads of the shanks must be the same as those of the cores; but it will be understood that under certain conditions plain-faced cores may be employed. The cores are thus movable out of and into the molds and are provided with caps 46, which are arranged to cover the open upper ends of the cavities of said molds. The upper ends of the shanks are provided with clutch members 47, comprising plates having upstanding pins 48. The means for moving these cores out of and into the molds will now be described.

Figures 2, 8:
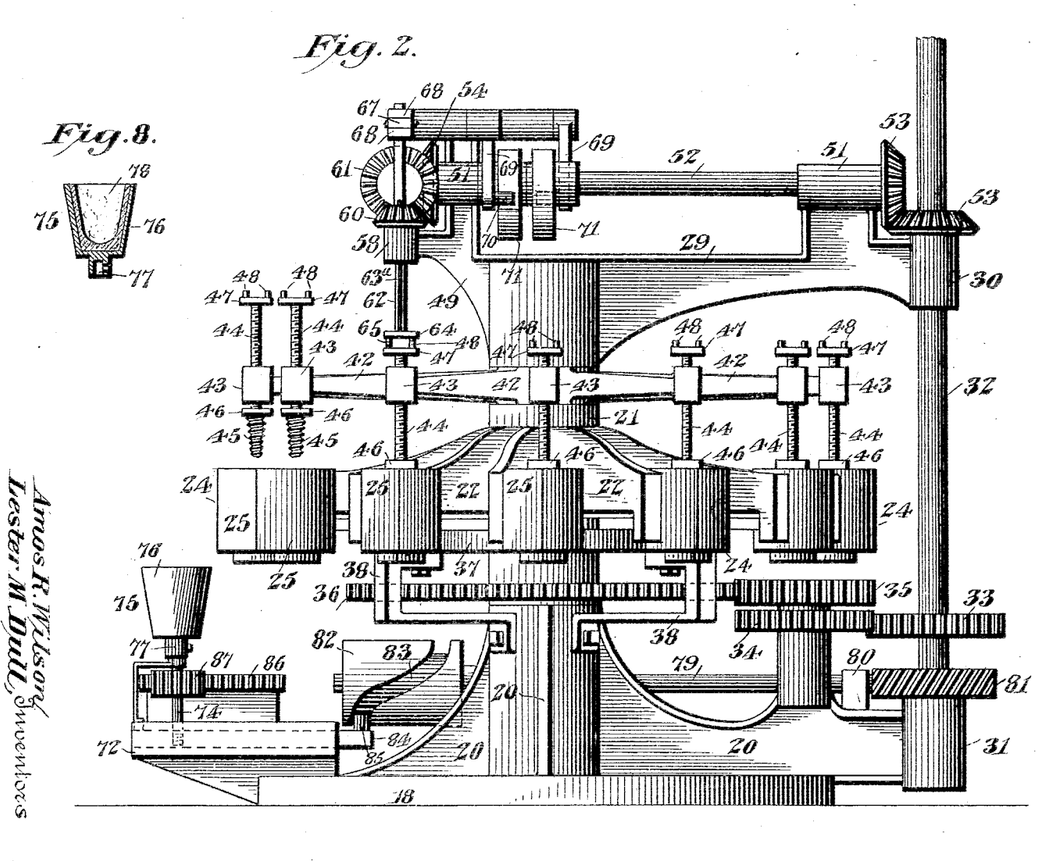
Fig. 2 is an elevation of the same.
Fig. 8 is a vertical sectional view through the receiver-cup.
Figures 3, 7:
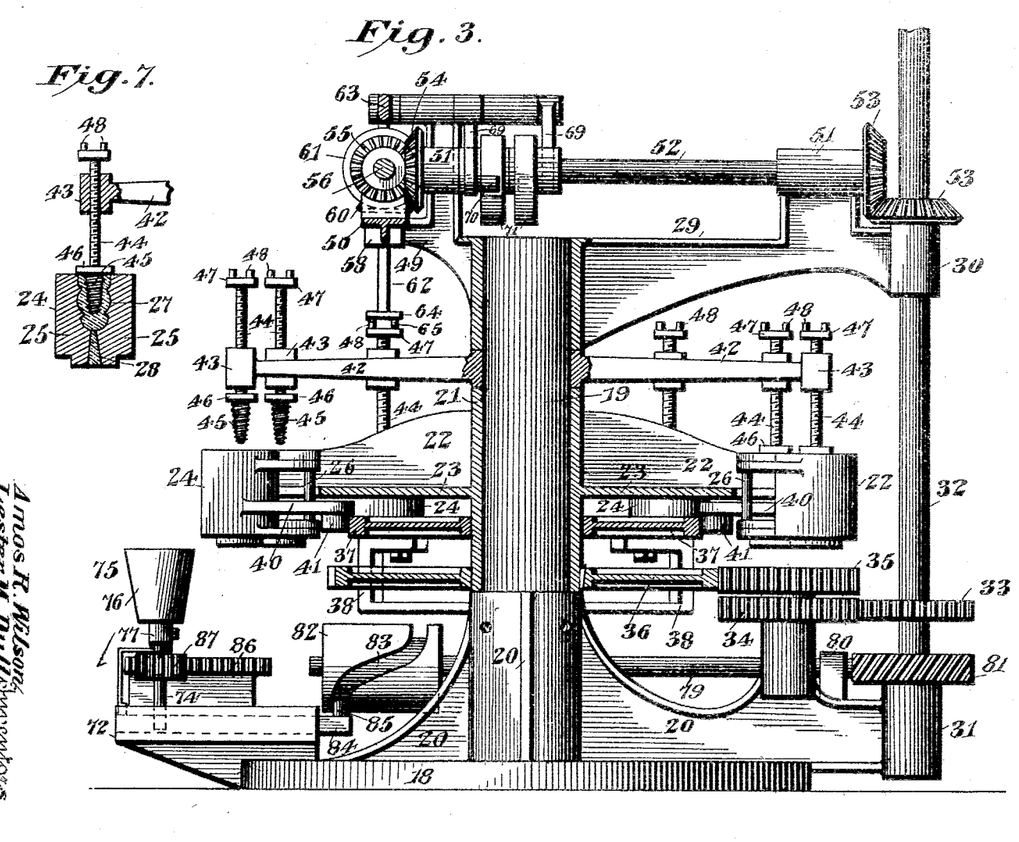
Fig. 3 is a longitudinal sectional view.
Fig. 7 is a detail sectional view through one of the molds after it has been filled.

The casting hereinbefore mentioned as being located at the upper end of the standard besides having the bracket 29 is also provided with an oppositely-extending bracket 49, having a cross-beam 50 at its outer end. The brackets 29 and 49 are provided with horizontally-disposed bearings 51, in which is journaled a counter-shaft 52, connected at one end by bevel-gears 53 with the driving-shaft 32. The other end carries a bevel-gear 54, meshing with a similar gear 55 on a stub-shaft 56, journaled in bearings 57, that constitute a part of the cross-beam 50. The ends of the cross-beam 50 are provided with upright collars 58, in which are journaled sleeves 59, having at their upper ends bevel gear-wheels 60, that mesh with similar wheels 61 on the ends of the stub-shaft 56. Slidably mounted in the sleeves 59 are vertically-moving rods 62, that are keyed, as shown at $63^a$, so as to revolve with the sleeves, these rods thus being rotated in opposite directions. Their lower ends are provided with clutch members 64, comprising plates having depending pins 65, that are arranged to engage with the pins 48 of the clutch members of the cores. Because of the gearing employed it will be evident that the rods 62 and the clutch members carried thereby will be rotated at a comparatively high rate of speed. The rods 62 are suspended from swinging arms 63, and for this purpose the outer ends of said arms are provided with sockets $64^a$, in which are slidably mounted shanks $65^a$, the free ends of which are bifurcated, as shown at 66, and are fastened to collars 67, through which the rods pass and in which they are freely rotatable. Other collars 68 are fastened to the rods 62 on opposite sides of the collars 67, and thus said rods are secured to the arms 63, though they are free to rotate. These arms 63 really constitute parts of bell-crank levers journaled upon the bracket 49, the other arms 69 of these levers being arranged in depending relation on opposite sides of the counter-shaft 52. The arms 69 are provided at their free ends with offset pins 70, that bear against cams 71, fastened to the counter-shaft and clearly illustrated in Figs. 2, 3, and 6. By this arrangement it will be seen that the suspended rods are continuously rotated and at predetermined intervals they are lowered, thus bringing their clutch members into engagement with the clutch members of the cores that are located beneath the same. As a result one of the cores will be raised while the other will be lowered, the one that is raised being located just in advance of the place where the molds open, and the one that is lowered in like manner being located just in advance of the glass-feeding mechanism, as set forth in Fig. 5.

In the present embodiment the following novel means is employed for receiving and removing the molded articles. A guideway 72 is secured to the base of the machine directly beneath the place where the molds open and extends some distance outside of the same, and in this guideway is mounted a reciprocatory slide 73, in which is journaled an upstanding stem 74, carrying a receiver 75 at its upper end. This receiver is in the form of a cup and comprises a metallic shell 76, having a socket 77 in its lower end that receives the upper end of the stem 74. It is lined with a non-combustible cushion substance 78, such as asbestos or similar material. The cup is movable to and away from a position beneath the opening-mold upon a reciprocation of the slide, and this slide is reciprocated by the following means: A countershaft 79 is journaled in suitable bearings 80 upon the base, one end of the shaft receiving power from the main driving-shaft 32 through oblique-toothed gears 81. The other end of this shaft carries a cam 82, provided with a groove 83. The slide has a finger 84, that is offset, as shown in Fig. 4, and is provided with a pin 85, engaging in the cam-groove. The receiver is also rotated, and for this purpose a stationary rack 86 is fastened to the guideway at one side of the same, and a pinion 87 attached to the stem 74 meshes with the rack.

It will of course be understood that the various elements—such as gears, cams, &c.—are of the necessary sizes and shapes and are so related that the different operations will be performed in proper order. These operations are substantially as follows: As an empty mold comes into position upon the platform 14 and over the discharge end of the conduit 15 air under pressure is admitted to the reservoir. This causes molten glass to be elevated through the conduit into the mold which is therefore filled, a suitable vent being allowed at the upper end for the escape of the air. As the mold moves away from its position the supply of compressed air is cut off until the next mold is in place. The filled mold travels two-thirds of the distance about the machine, and thus the glass will cool to an extent sufficient to hold its shape. At this point the clutch member 65 is suddenly lowered into engagement with the clutch member of the core and two rotating together said core will be elevated out of the mold. As this operation is comparatively rapid, the rotation of the carrier will not interfere with it. After the core has been raised the mold begins to open, and this opening movement is completed at the time that the receiving-cup is located beneath the same. The article therefore drops into said cup, which is automatically projected and at the same time rotated, so that the article is carried away from the machine and its shape is better preserved by the rotation. From the receiver the said article is taken by hand. After passing the discharging means the mold will close, and just before it again reaches the glass-feeding mechanism the core is again lowered to its proper position within the same. It will therefore be seen that articles of various kinds may be rapidly manufactured by means of this machine and that the services of skilled workmen are not required. It is especially desired to call attention to the following features: First, the feeding of the glass to the mold after the core has been placed therein. As before stated, this avoids the necessity of predetermined measured batches that have heretofore been necessary and the forcing of the cores into the same. The means for actuating the cores both in lowering and raising the same is very simple and is driven by the same power employed in operating the machine as a whole. The device for removing the molded articles is also an important feature of the present invention, as it prevents breakage and prevents to a large extent misshapen articles should the glass not be hardened to a sufficient extent as the article drops from the mold.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus fully described our invention, what we claim as new, and desire to secure by Letters Patent, is—

1. In a machine of the class described, the combination with a reservoir, of a mold, a core movable into and out of the mold, means for moving the core, and means associated with the reservoir independently of the mold for effecting the elevation of the glass from the lower portion of the reservoir into the mold.

2. In a machine of the class described, the combination with a closed reservoir, of a movable mold having an inlet, a core movable into and out of the mold, means for moving the core, a conduit leading from the lower portion of the reservoir upwardly and having its delivery end in line with the path of movement of the mold-inlet, and means for introducing fluid under greater than atmospheric pressure into the reservoir to elevate the glass from the conduit into the mold.

3. In a machine of the class described, the combination with a mold, of a core removable through the top of the mold, a closed reservoir for glass, means for placing the glass in the reservoir under greater than atmospheric pressure, and means for directing said glass from the lower portion of the reservoir through the lower portion of and into the mold.

4. In a machine of the class described, the combination with glass-feeding mechanism, of a mold movable over said feeding mechanism, a core, and means for automatically placing the core in the mold as the same moves toward its position over the glass-feeding mechanism.

5. In a machine of the class described, the combination with glass-feeding mechanism, of a carrier arranged contiguous thereto, a plurality of molds mounted upon the carrier and movable successively over the glass-feeding mechanism, a plurality of cores coacting with the molds, and means for successively placing each core in its mold as the same moves toward its position over the glass-feeding mechanism.

6. In a machine of the class described, the combination with glass-feeding mechanism, of a carrier arranged contiguous thereto, a plurality of molds mounted upon the carrier and movable successively over the glass-feeding mechanism, a plurality of cores coacting with the molds, and common means for successively placing each core in its mold as the same moves toward its position over the glass-feeding mechanism.

7. In a machine of the class described, the combination with glass-feeding mechanism, of a carrier arranged contiguous thereto, a plurality of molds mounted upon the carrier and movable successively over the glass-feeding mechanism, a plurality of cores coacting with the molds, and a common actuating device automatically connecting with each core to move the same into the mold as said mold moves toward its position over the glass-feeding mechanism.

8. In a machine of the class described, the combination with a mold, of a core coacting therewith and carrying a clutch member, means for moving the core, said means including a rotating clutch member that is movable into and out of engagement with the member of the core to rotate the same, said member of the core being movable into and out of line with the rotating clutch member and automatic means for moving the latter clutch member at predetermined intervals.

9. In a machine of the class described, the combination with a mold, of a core coacting therewith and carrying a clutch member, said clutch member and core being rotatable and having a reciprocatory movement, means for moving the core, said means including a rotating clutch member that is movable into and out of engagement with the member of the core to rotate the same and is also arranged to reciprocate with the core when in engagement, and mechanism for automatically reciprocating said means at predetermined intervals.

10. In a machine of the class described, the combination with a mold, of a core coacting therewith and longitudinally movable into and out of the mold, and means for moving the core, said means including an arm arranged to have a connection with the core and movable therewith throughout the length of the movement of said core, and automatic mechanism for moving the arm.

11. In a machine of the class described, the combination with a mold, of a core coacting therewith and longitudinally movable into and out of the mold, and mechanism for moving the core, said mechanism including a swinging arm arranged to have a connection with the core and movable therewith throughout the length of movement of the core, and continuously-operating means for swinging the arm at intervals.

12. In a machine of the class described, the combination with a mold, of a core coacting therewith and having a reciprocatory movement into and out of the mold, and means for moving the core, said means including a swinging arm arranged to have a connection with the core, and a rotatable cam having an engagement with the arm.

13. In a machine of the class described, the combination with a mold, of a reciprocatory core movable into and out of the mold, a bell-crank lever, one arm of which is arranged to have a connection with the core, and automatically-driven means engaging the other arm to swing the lever.

14. In a machine of the class described, the combination with a mold, of a reciprocatory core movable into and out of the mold, a bell-crank lever, one arm of which is arranged to have a connection with the core, and a cam having an engagement with the free end of the other arm to move the lever.

15. In a machine of the class described, the combination with a mold, of a core coacting therewith and having a clutch member, a movable arm, a continuously-driven member for operating the arm, a clutch member carried by the arm and movable into engagement with the member of the core when the arm is moved, and means for rotating the clutch member of the arm.

16. In a machine of the class described, the combination with a mold, of a core coacting therewith and having a clutch member, a movable arm, automatic means for moving the arm at intervals and a continuously-rotating clutch member carried by the arm and movable into engagement with the member of the core when the arm is moved.

17. In a machine of the class described, the combination with a plurality of molds, of a reciprocatory and rotatable core coacting with each mold, and an automatically-operated device successively engaging the cores for successively reciprocating and rotating each at predetermined intervals.

18. In a machine of the class described, the combination with a plurality of molds, of a core coacting with each mold and carrying a clutch member, said cores each having a reciprocatory and rotary movement, and common driving means for successively reciprocating and rotating the clutch members and cores, said driving means comprising a clutch member movable successively into and out of engagement with the members of the cores and automatic means for effecting the movement of said clutch member.

19. In a machine of the class described, the combination with a mold, of a core coacting therewith and having a clutch member, a swinging arm, a rotary gear, a continuously-rotating rod suspended from the arm and passing through the gear, said rod carrying a clutch member at its lower end that is movable into and out of engagement with the member of the core, and a shaft connected with the gear and carrying a cam that actuates the swinging arm.

20. In a machine of the class described, the combination with a carrier, of a plurality of molds mounted thereon, cores coacting with the molds and having clutch members, and means for actuating the cores, said means including a movable clutch member that coacts successively with the members of the cores, and automatic means for moving the clutch member successively into and out of coacting relation with the members of the cores.

21. In a machine of the class described, the combination with a carrier, of a plurality of molds mounted thereon, cores coacting with the molds and having clutch members, and means for actuating the cores, said means including a rotating clutch member that coacts successively with the members of the cores to successively move the same into the molds, another clutch member that in like manner coacts successively with the members of the cores to successively remove the cores from the molds, and common driving means for actuating both clutch members.

22. In a machine of the class described, the combination with a rotatable carrier, of molds mounted thereon, cores coacting with the molds, separate devices for lowering and raising the cores, and common mechanism for actuating both devices.

23. In a machine of the class described, the combination with a rotatable carrier, of a circular series of molds mounted thereon, cores coacting with the molds and having clutch members, and means for actuating the cores, said means including a rotary and reciprocatory clutch member that coacts successively with the members of the cores, and common mechanism for rotating and reciprocating the clutch members.

24. In a machine of the class described, the combination with a carrier, of a plurality of molds mounted thereon, reciprocatory and rotary cores coacting with the molds and having clutch members, and mechanism for actuating the cores, said mechanism including a clutch member that coacts successively with the members of the cores, and means for automatically reciprocating and rotating the clutch member.

25. In a machine of the class described, the combination with a mold, of a reciprocatory and rotatable core movable into and out of the mold, continuously-operated driving means, and mechanism connected to and driven by the driving means and interposed between said driving means and core for both automatically reciprocating and rotating the core at predetermined intervals.

26. In a machine of the class described, the combination with a rotatable carrier, of a plurality of molds mounted thereon, a plurality of cores suspended over the molds and movable out of and into the same, movable arms carrying clutches that are adapted to successively engage the cores to respectively move them, said arms being located at separated points about the carrier and being non-rotatable therewith, and automatic means for moving the arms to bring the clutches into engagement with the cores, as said cores move into position for coacting therewith.

27. In a machine of the class described, the combination with a rotatable carrier, of a plurality of molds mounted thereon, cores suspended over the molds and movable into and out of the same, a swinging arm arranged to successively engage the cores to move the same, and automatic means for swinging the arms at intervals.

28. In a machine of the class described, the combination with a mold, of a rotatable and reciprocatory core movable into and out of the mold, a driving-shaft, and mechanism interposed between the shaft and core for rotating and reciprocating said core at predetermined intervals.

29. In a machine of the class described, the combination with a standard, of a revoluble carrier mounted thereon, molds mounted on the carrier, cores suspended over the molds and movable into and out of the same, and vertically-swinging arms mounted upon the upper end of the standard, and non-rotatable with the carrier, said arms being arranged to successively engage the cores to move them in different directions, and common means for swinging the arms.

30. In a machine of the class described, the combination with a standard, of a carrier journaled upon the standard, molds mounted upon the carrier, cores coacting with the molds and movable into and out of the same, a swinging arm arranged to move the cores, a shaft, and a cam carried by the shaft and coacting with the arm to swing the same.

31. In a machine of the class described, the combination with a standard having brackets at its upper end, of a carrier journaled upon the standard, molds mounted upon the carrier, cores suspended over the molds and movable into and out of the same, a vertically-swinging arm mounted upon one of the brackets and arranged to move the cores, and shafting mounted upon the brackets for moving the arm.

32. In a machine of the class described, the combination with a standard having brackets at its upper end, of a carrier journaled upon the standard, molds mounted upon the carrier, cores suspended over the molds and movable into and out of the same, oppositely-projecting swinging arms mounted upon the brackets and carrying rotatable clutch members that engage the cores to move the same, and shafting mounted upon the brackets for moving the arms and rotating the clutch members.

33. In a machine of the class described, the combination with a standard, of a carrier journaled thereon, a cam secured against rotation with the carrier, and molds mounted on the carrier, said molds each comprising hinged sections, one of which is provided at its hinged side with a rigidly-attached finger that projects on the opposite side of the hinge to the section and bears against the cam.

34. In a machine of the class described, the combination with a standard, of a carrier journaled thereon, a cam secured against rotation with the carrier and having its active edge located within the edge of the carrier, and molds mounted on the carrier, said molds each comprising hinged sections, an inwardly-extending rigidly-attached finger projecting from the hinged side of one of the sections and extending on the side of the hinge opposite said section, and a roller secured to the free end of the finger and bearing against the cam.

35. In a machine of the class described, the combination with a mold comprising swinging sections, of means for swinging the sections to open the mold and a receiver for the article molded, said receiver being movable to and away from a position beneath the mold.

36. In a machine of the class described, the combination with a mold comprising hinged sections, of means for swinging the sections to open the mold, and a receiver-cup for the article molded, said cup being movable to and away from a position beneath the mold and having an incombustible cushion-lining.

37. In a machine of the class described, the combination with a mold comprising hinged sections, of means for swinging the sections to open the molds, a receiver movable to and away from a position beneath the mold, and mechanism for automatically positioning the receiver beneath the mold when the means are actuated to open said mold.

38. In a machine of the class described, the combination with a movable carrier, of a plurality of molds mounted thereon and operable at a predetermined point to permit the articles formed therein to drop beneath the carrier, driving means for moving the carrier, a receiver movable beneath the carrier at said point to receive the articles from the molds, and mechanism operated by the driving means for actuating the receiver.

39. In a machine of the class described, the combination with a rotary carrier having a plurality of molds comprising sections hinged on a vertical pivot, of means for swinging the sections to open the molds, a receiver for the articles molded, said receiver being movable beneath the molds, and means for moving the receiver.

40. In a machine of the class described, the combination with a rotary carrier having a plurality of molds comprising sections hinged on a vertical pivot, of means for swinging the sections to open the molds, a common receiver for successively catching the articles molded, said receiver being movable to and away from a position beneath the molds, and means for moving the receiver to a position beneath the molds during the opening movement of the same.

41. In a machine of the class described, the combination with a mold, of a reciprocatory slide mounted beneath the mold, and a receiver for the article molded, said receiver being carried by the slide.

42. In a machine of the class described, the combination with a mold, of a reciprocatory slide mounted beneath the mold, a receiver for the article molded carried by the slide, a cam, and a connection between the cam and the slide.

43. In a machine of the class described, the combination with a mold, of a reciprocatory slide mounted beneath the mold, a receiver for the article molded mounted upon the slide, a cam journaled contiguous to the slide and having a groove, and a finger carried by the slide and engaging the cam-groove.

44. In a machine of the class described, the combination with a mold, of a reciprocatory slide mounted beneath the mold, a receiver for the article molded journaled upon the slide, a rack located alongside the slide, and a pinion carried by the receiver and engaging the rack.

45. In a machine of the class described, the combination with a carrier, of a plurality of molds mounted thereon, a reciprocatory slide located beneath the molds, a receiver-cup journaled on the slide, a rack located alongside the slide, a pinion carried by the cup and engaging the rack, a rotatable cam, and a finger carried by the slide and engaging the cam, whereby said slide is reciprocated.

46. In a machine of the class described, the combination with a suspended mold having a bottom inlet and an open top, of a core fitted in the mold and removable through the top, an inclosed reservoir for glass, means for supplying fluid under greater than atmospheric pressure to the reservoir, and a conduit for directing the glass from the reservoir into the bottom of the mold after said core is in place.

47. In a machine of the class described, the combination with a reservoir for glass, of a plurality of molds, common means associated with the reservoir for directing the glass from the reservoir to a point above the level of the glass therein, said molds being successively movable into and out of coaction with the directing means, cores movable into and out of the molds, means for effecting the movement of the glass through the directing means, and means for effecting the movements of the cores.

48. In a machine of the class described, the combination with glass-feeding means including a conduit, of a mold having a lower inlet, means for opening the mold, and mechanism for successively moving the mold over the discharge end of the conduit and into coacting relation with the opening means.

49. In a machine of the class described, the combination with a movable mold, of glass-feeding means, a receiver for the finished article, and mechanism for moving the mold into coacting relation with the glass-feeding means and afterward opening said mold to deposit the article in the receiver.

50. In a machine of the class described, the combination with a movable mold, of glass-feeding means including a conduit having a discharge located beneath the path of movement of the mold, a receiver for the finished article also located below the path of movement of the mold, and mechanism for moving the mold over the feeding means and afterward over the receiver.

51. In a machine of the class described, the combination with a reservoir for glass, of a delivery device leading from the reservoir to a point above the level of the glass therein, a mold having a lower inlet, mechanism for moving the mold with its inlet over and in coacting relation with the delivering device, and means for elevating the glass from the reservoir through the delivering device to the mold.

52. In a machine of the class described, the combination with a reservoir for glass, of a delivering device leading from the reservoir to a point above the level of the glass therein, a mold having an inlet for glass in its lower portion, and means for moving the mold so that its inlet will aline with the delivering device.

53. In a machine of the class described, the combination with a reservoir for glass, of a mold having an inlet for the glass in its lower portion, a core movably fitted in the mold, and means for elevating the glass from the reservoir through the inlet of and into the mold.

54. In a machine of the class described, the combination with a reservoir, of a mold-receiving platform, a conduit leading from the reservoir to the platform, a mold movable over the platform and the conduit and having a bottom inlet to receive the glass that passes through the latter, and means for moving the mold.

55. In a machine of the class described, the combination with a reservoir, of a mold-receiving platform, a conduit leading from the reservoir through the platform to the upper face thereof, a mold movable over the platform and having an inlet in its bottom, said inlet being arranged to aline with the discharge end of the conduit, and means for moving the mold.

56. In a machine of the class described, the combination with a reservoir, of a mold-receiving platform, a conduit leading from the reservoir to the platform, a plurality of molds movable over the upper face of the platform and having inlets in their bottoms that are arranged to aline with the discharge end of the conduit, and means for successively moving the molds over the platform.

57. In a machine of the class described, the combination with glass-feeding mechanism, of a carrier, molds mounted on the carrier and successively movable over the mechanism, a plurality of cores coacting with the molds, means for introducing the cores through the upper ends of the molds prior to the feed of glass thereto, and means for removing the cores after the molds have passed the feeding mechanism.

58. In a machine of the class described, the combination with a mold having an open top and bottom, of a core detachably fitted in the mold and removable through the top of the same, means for introducing glass through the bottom of the mold, and mechanism located above the mold for raising and lowering the core.

In testimony that we claim the foregoing as our own we have hereto affixed our signatures in the presence of two witnesses.

AMOS ROBERROW WILSON.
  LESTER MARTIN DULL.

Witnesses:
  B. D. MILLS,
  J. T. BRADFORD.